(12) United States Patent
Singh et al.

(10) Patent No.: US 12,282,913 B2
(45) Date of Patent: Apr. 22, 2025

(54) MOBILE WIRELESS COMMUNICATIONS DEVICE HAVING DIGITAL WALLET WITH MULTI-MODE USER CARD AND RELATED METHODS

(71) Applicant: MALIKIE INNOVATIONS LIMITED, Dublin (IE)

(72) Inventors: Ravi Singh, Toronto (CA); Neil Patrick Adams, Waterloo (CA); Geoffrey Wendell MacGillivray, Waterloo (CA)

(73) Assignee: Malikie Innovations Limited, Dublin (IE)

( * ) Notice: Subject to any disclaimer, the term of this patent is extended or adjusted under 35 U.S.C. 154(b) by 57 days.

(21) Appl. No.: 17/239,182

(22) Filed: Apr. 23, 2021

(65) Prior Publication Data
US 2021/0241262 A1    Aug. 5, 2021

Related U.S. Application Data

(63) Continuation of application No. 13/916,979, filed on Jun. 13, 2013, now Pat. No. 11,037,137.

(51) Int. Cl.
*G06Q 20/36* (2012.01)
*G06Q 20/32* (2012.01)
(Continued)

(52) U.S. Cl.
CPC ......... *G06Q 20/36* (2013.01); *G06Q 20/3224* (2013.01); *G06Q 20/3278* (2013.01);
(Continued)

(58) Field of Classification Search
None
See application file for complete search history.

(56) References Cited

U.S. PATENT DOCUMENTS 6,656,050 B2    12/2003    Busch et al.
7,240,843 B2    7/2007    Paul et al.
(Continued)

FOREIGN PATENT DOCUMENTS

DE    102011016821 A1    10/2012
WO    2006095212 A1    9/2006
(Continued)

OTHER PUBLICATIONS

"Google Wallet Integration" 2013.
(Continued)

*Primary Examiner* — William J Jacob
(74) *Attorney, Agent, or Firm* — Botos Churchill IP Law LLP

(57) ABSTRACT

A mobile wireless communications device may include a housing, a wireless transceiver carried by the housing, a memory carried by the housing, a display carried by the housing, and a processor carried by the housing. The processor is configured to implement a digital wallet including a multi-mode user card having first and second user interface modes, and selectively change the multi-mode user card from the first user interface mode to the second user interface mode based upon a current location, a current time, or a determined event. The second user interface mode includes one or more of a mapping interface mode, a survey interface mode, or a purchase interface mode.

20 Claims, 13 Drawing Sheets

(51) Int. Cl.
  *G06Q 20/40* (2012.01)
  *H04W 4/029* (2018.01)
  *H04W 4/80* (2018.01)
(52) U.S. Cl.
  CPC .......... *G06Q 20/405* (2013.01); *H04W 4/029* (2018.02); *H04W 4/80* (2018.02)

(56) References Cited

U.S. PATENT DOCUMENTS

| | | | |
|---|---|---|---|
| 7,334,735 | B1 | 2/2008 | Antebi et al. |
| 8,261,978 | B2 | 9/2012 | Gangi |
| 9,635,305 | B1 | 4/2017 | Streibig et al. |
| 2003/0013438 | A1 | 1/2003 | Darby |
| 2005/0245241 | A1* | 11/2005 | Durand ............... H04L 65/1101 455/414.1 |
| 2006/0206376 | A1* | 9/2006 | Gibbs ............... G06Q 30/0236 705/14.27 |
| 2006/0224450 | A1 | 10/2006 | Moon |
| 2008/0010215 | A1 | 1/2008 | Rackley, III et al. |
| 2008/0052164 | A1* | 2/2008 | Abifaker ............ G06Q 30/0601 705/14.27 |
| 2008/0059282 | A1 | 3/2008 | Vallier et al. |
| 2009/0156190 | A1 | 6/2009 | Fisher |
| 2010/0076833 | A1* | 3/2010 | Nelsen ................. G06Q 20/357 705/26.1 |
| 2010/0223110 | A1* | 9/2010 | Slavin ................ G06Q 30/0229 709/217 |
| 2011/0179113 | A1* | 7/2011 | Thomas ............. G06Q 20/3574 709/203 |
| 2011/0208585 | A1 | 8/2011 | Daboll et al. |
| 2011/0244796 | A1* | 10/2011 | Khan ..................... H04W 4/80 455/41.1 |
| 2011/0282784 | A1* | 11/2011 | Nelsen ................ G06Q 20/105 705/41 |
| 2012/0059741 | A1* | 3/2012 | Khan ................. G06Q 30/0633 705/27.1 |
| 2012/0066043 | A1* | 3/2012 | Carmichael ........ G06Q 30/0207 705/14.23 |
| 2012/0124496 | A1* | 5/2012 | Rose .................. G06Q 20/3224 715/763 |
| 2012/0171992 | A1* | 7/2012 | Cheong ................... G06F 21/88 455/410 |
| 2012/0220219 | A1 | 8/2012 | Hill et al. |
| 2013/0024364 | A1 | 1/2013 | Shrivastava et al. |
| 2013/0073336 | A1 | 3/2013 | Heath |
| 2013/0080322 | A1* | 3/2013 | Adolphe ................ G06Q 20/36 705/41 |
| 2013/0103523 | A1 | 4/2013 | Okonkwo et al. |
| 2014/0249904 | A1* | 9/2014 | Nelsen ............... G06Q 30/0222 705/14.23 |
| 2014/0372298 | A1 | 12/2014 | Singh et al. |
| 2015/0302453 | A1 | 10/2015 | Tietzen et al. |

FOREIGN PATENT DOCUMENTS

| | | |
|---|---|---|
| WO | 2009018255 A2 | 2/2009 |
| WO | 2009055704 A2 | 4/2009 |

OTHER PUBLICATIONS

"Stampt", Mobivity—Mobile Marketing for Local Advertisers May 6, 2013.

"Electronic Commerce Modeling Language (ECML) Support", Help—WebSphere Commerce version 5.6 May 6, 2013.

"Electronic Commerce Modeling Language (ECML)", Version 2 Specification, Network Working Group, Motorola Laboratories Jun. 2005.

Examination Report dated Jul. 17, 2020 from EP 18189361.1 Jul. 17, 2020.

Office Action dated Aug. 3, 2020 from U.S. Appl. No. 16/186,093, filed Aug. 3, 2020.

Office Action dated Feb. 4, 2021 from U.S. Appl. No. 16/186,093, filed Feb. 4, 2021.

Summons to attend oral proceedings dated Feb. 14, 2021 from EP 18189361.1 Feb. 14, 2021.

Anonymous: "Event-driven programming—Wikipedia", May 19, 2013, XP055791850, Retrieved from the Internet: URL: https://en.wikipedia.org/w/index.php?title=Event-driven_programming&oldid=555792149 [retrieved on Mar. 21, 2021] May 19, 2013.

Office Action dated Aug. 23, 2021 from U.S. Appl. No. 16/186,093, 10 pgs.

Office Action dated Jun. 16, 2022 from U.S. Appl. No. 16/186,093, 10 pgs.

Notice of Allowance dated Oct. 13, 2022 from U.S. Appl. No. 16/186,093, 8 pgs.

\* cited by examiner

MOBILE WIRELESS COMMUNICATIONS DEVICE HAVING DIGITAL WALLET WITH MULTI-MODE USER CARD AND RELATED METHODS

CROSS-REFERENCE TO RELATED APPLICATIONS

This application is a continuation of application Ser. No. 13/916,979, filed Jun. 13, 2013, incorporated herein by reference in its entirety. Other features relating to wireless communications devices are disclosed in application Ser. No. 13/916,927, now abandoned, incorporated herein by reference in its entirety.

TECHNICAL FIELD

This application relates to the field of communications, and more particularly, to mobile wireless communications devices and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters. New uses or improvements regarding data/features for mobile communication devices and/or short range communications, such as NFC, may be desired.

DETAILED DESCRIPTION

Figure 1:
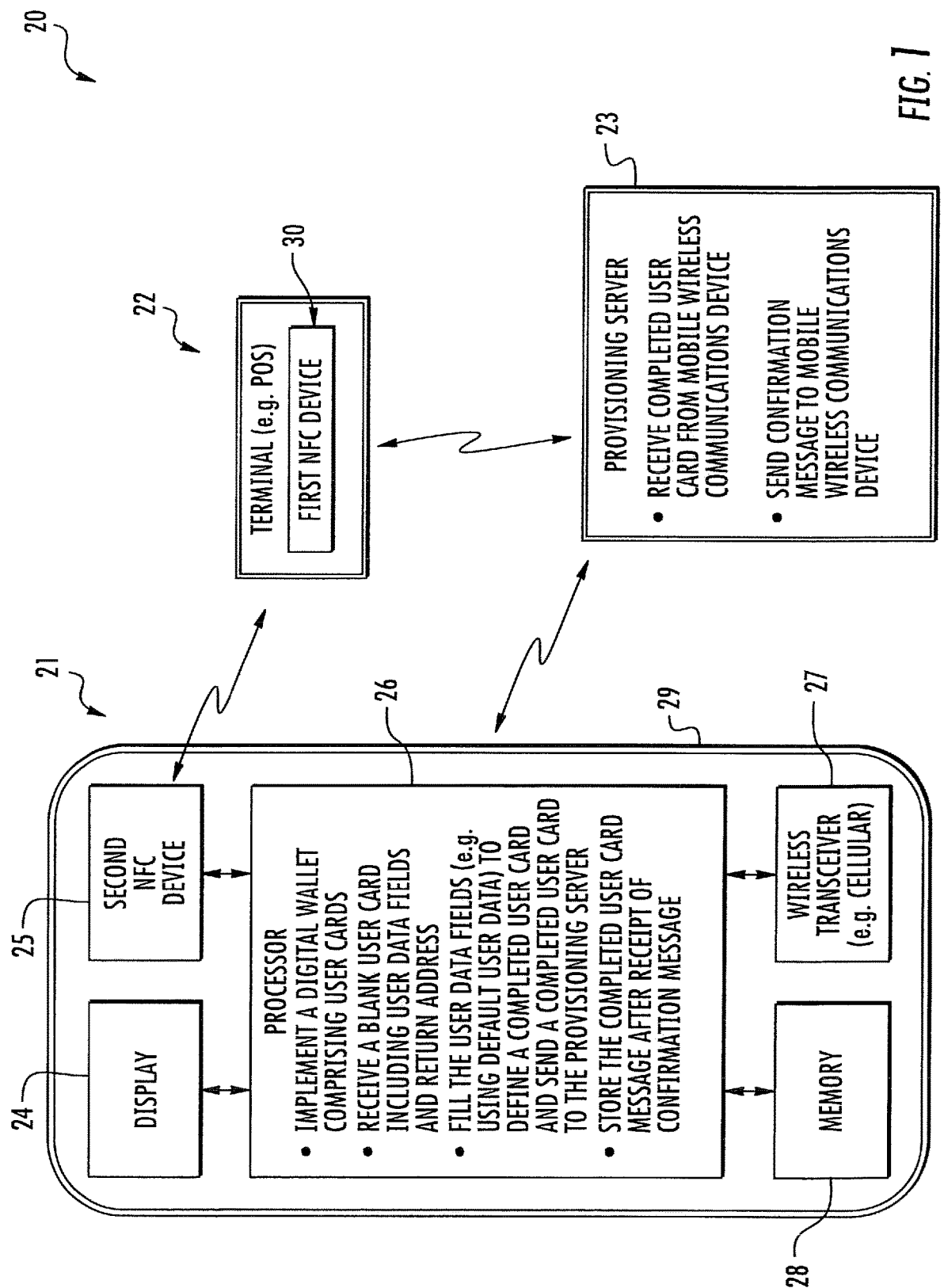
FIG. 1 is a schematic block diagram of an example embodiment of a communication system.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a communication system may include a terminal comprising a first NFC device. The terminal may be capable of receiving data from a provisioning server. The communication system may also include a mobile wireless communications device. The mobile wireless communications device may include a housing, a wireless transceiver, for example, a cellular transceiver, carried by the housing, a second NFC device carried by the housing, a memory carried by the housing, a display carried by the housing, and a processor carried by the housing and coupled to the wireless transceiver, the second NFC device, the memory, and the display. The processor may be configured to implement a digital wallet comprising a plurality of user cards, receive from the terminal, via the second NFC device, a blank user card including a plurality of user data fields, and fill the plurality of user data fields of the blank user card to define a completed user card and send the completed user card to the provisioning server.

The processor may be configured to receive a confirmation message from the provisioning server, and to store the completed user card in the memory for the digital wallet after receipt of the confirmation message. The processor may also be configured to store in the memory default user data for the digital wallet, and to fill the plurality of user data fields based upon the stored default user data.

More specifically, the processor may be configured to display the completed user card on the display. In some embodiments, the processor may be configured to send the completed user card to the provisioning server via the wireless transceiver. In other embodiments, the processor may be configured to send the completed user card to the provisioning server via the second NFC device.

For example, the terminal may comprise a point-of-sale (POS) terminal. The blank user card may have a return address for the provisioning server associated therewith. Also, the plurality of user data fields may comprise a name field, a mailing address field, and an email address field.

Another aspect is directed to a method of operating a mobile wireless communications device communicating with a terminal comprising a first NFC device, the terminal being capable of receiving data from a provisioning server. The method may comprise using a processor and memory cooperating therewith in the mobile wireless communications device to implement a digital wallet comprising a plurality of user cards, receive from the terminal, via a second NFC device in the mobile wireless communications device, a blank user card including a plurality of user data fields, and fill the plurality of user data fields of the blank user card to define a completed user card and send the completed user card to the provisioning server.

Yet another aspect is directed to a mobile wireless communications device including a housing, a wireless transceiver, for example, a cellular transceiver, carried by the housing, a location determining device carried by the housing and configured to determine a current location, a memory carried by the housing, a display carried by the housing, and a processor carried by the housing and coupled to the wireless transceiver, the location determining device, the memory, and the display. The processor may be configured to implement a digital wallet comprising at least one multi-mode user card having first and second user interface modes, and selectively change the at least one multi-mode user card from the first user interface mode to the second user interface mode based upon the current location. The second user interface mode may comprise a mapping interface mode.

For example, the at least one multi-mode user card may comprise a customer loyalty card, a coupon card, or an event ticket card. The first user interface mode may comprise a card display mode. The processor may be configured to store in the memory a trigger location associated with the at least one multi-mode user card, and selectively change the at least one multi-mode user card from the first user interface mode to the second user interface mode based upon the current location being within a threshold distance of the trigger location. The mapping interface mode may comprise a navigational direction mode.

Another aspect is directed to a mobile wireless communications device that may comprise a housing, a wireless transceiver carried by the housing, and a time determining device carried by the housing and configured to determine a current time. The mobile wireless communications device may also include a memory carried by the housing, a display carried by the housing, and a processor carried by the housing and coupled to the wireless transceiver, the time determining device, the memory, and the display. The processor may be configured to implement a digital wallet comprising at least one multi-mode user card having first and second user interface modes, and selectively change the at least one multi-mode user card from the first user interface mode to the second user interface mode based upon the current time, the second user interface mode comprising at least one of a survey interface mode and a purchase interface mode.

The first user interface mode may comprise a card display mode. The processor may be configured to store in the memory a trigger time associated with the at least one multi-mode user card, and selectively change the at least one multi-mode user card from the first user interface mode to the second user interface mode based upon the current time being within a threshold time of the trigger time.

Another aspect is directed to a mobile wireless communications device including a housing, a wireless transceiver carried by the housing, an event determining device carried by the housing and configured to determine an event, a memory carried by the housing, a display carried by the housing, and a processor carried by the housing and coupled to the wireless transceiver, the event determining device, the memory, and the display. The processor may be configured to implement a digital wallet comprising at least one multi-mode user card having first and second user interface modes, and selectively change the at least one multi-mode user card from the first user interface mode to the second user interface mode based upon the determined event, the second user interface mode comprising at least one of a survey interface mode and a purchase interface mode. The first user interface mode may comprise a card display mode.

Another aspect is directed to a method of operating a mobile wireless communications device that may include using a processor coupled to a wireless transceiver, a location determining device, a memory, and a display to implement a digital wallet comprising at least one multi-mode user card having first and second user interface modes, and selectively change the at least one multi-mode user card from the first user interface mode to the second user interface mode based upon a current location. The second user interface mode may comprise a mapping interface mode.

Another aspect is directed to a method of operating a mobile wireless communications device that may include using a processor coupled to a wireless transceiver, a time determining device, a memory, and a display to implement a digital wallet comprising at least one multi-mode user card having first and second user interface modes, and selectively change the at least one multi-mode user card from the first user interface mode to the second user interface mode based upon a current time. The second user interface mode may comprise at least one of a survey interface mode and a purchase interface mode.

Another aspect is directed to a method of operating a mobile wireless communications device that may include using a processor coupled to a wireless transceiver, an event determining device, a memory, and a display to implement a digital wallet comprising at least one multi-mode user card having first and second user interface modes, and selectively change the at least one multi-mode user card from the first user interface mode to the second user interface mode based upon a determined event. The second user interface mode may comprise at least one of a survey interface mode and a purchase interface mode.

Example mobile wireless communications devices may include portable or personal media players (e.g., music or MP3 players, video players, etc.), remote controls (e.g., television or stereo remotes, etc.), portable gaming devices, portable or mobile telephones, smartphones, tablet computers, etc.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication, which may have different operating frequencies, effective ranges, etc., for example, may also be used.

Figures 2, 3:
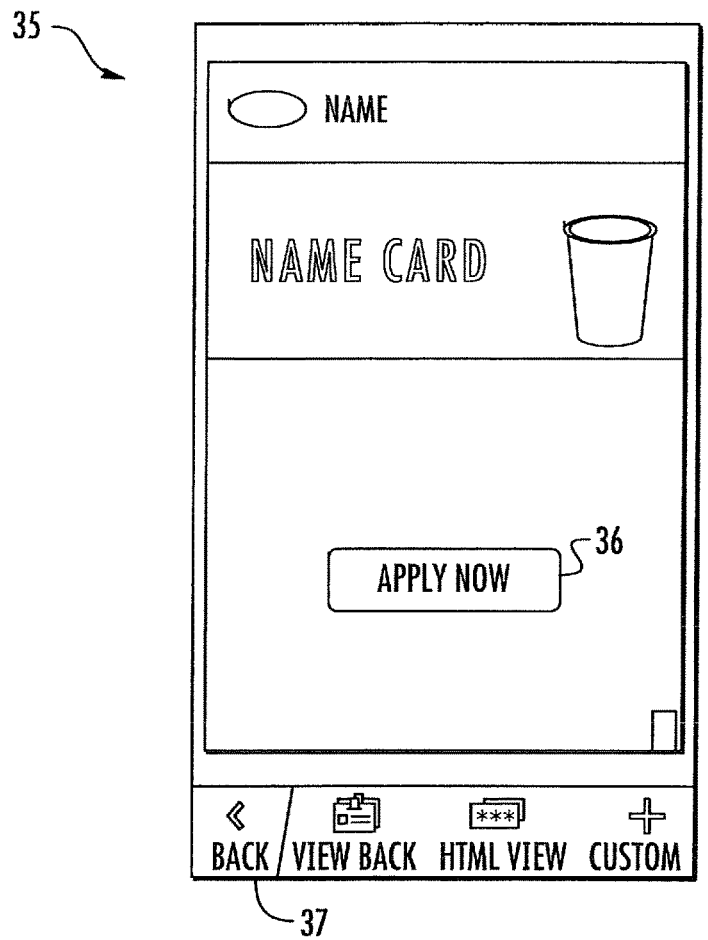
FIGS. 2-3 are screenshots from a mobile wireless communications device from the communication system of FIG. 1.
Figure 4:
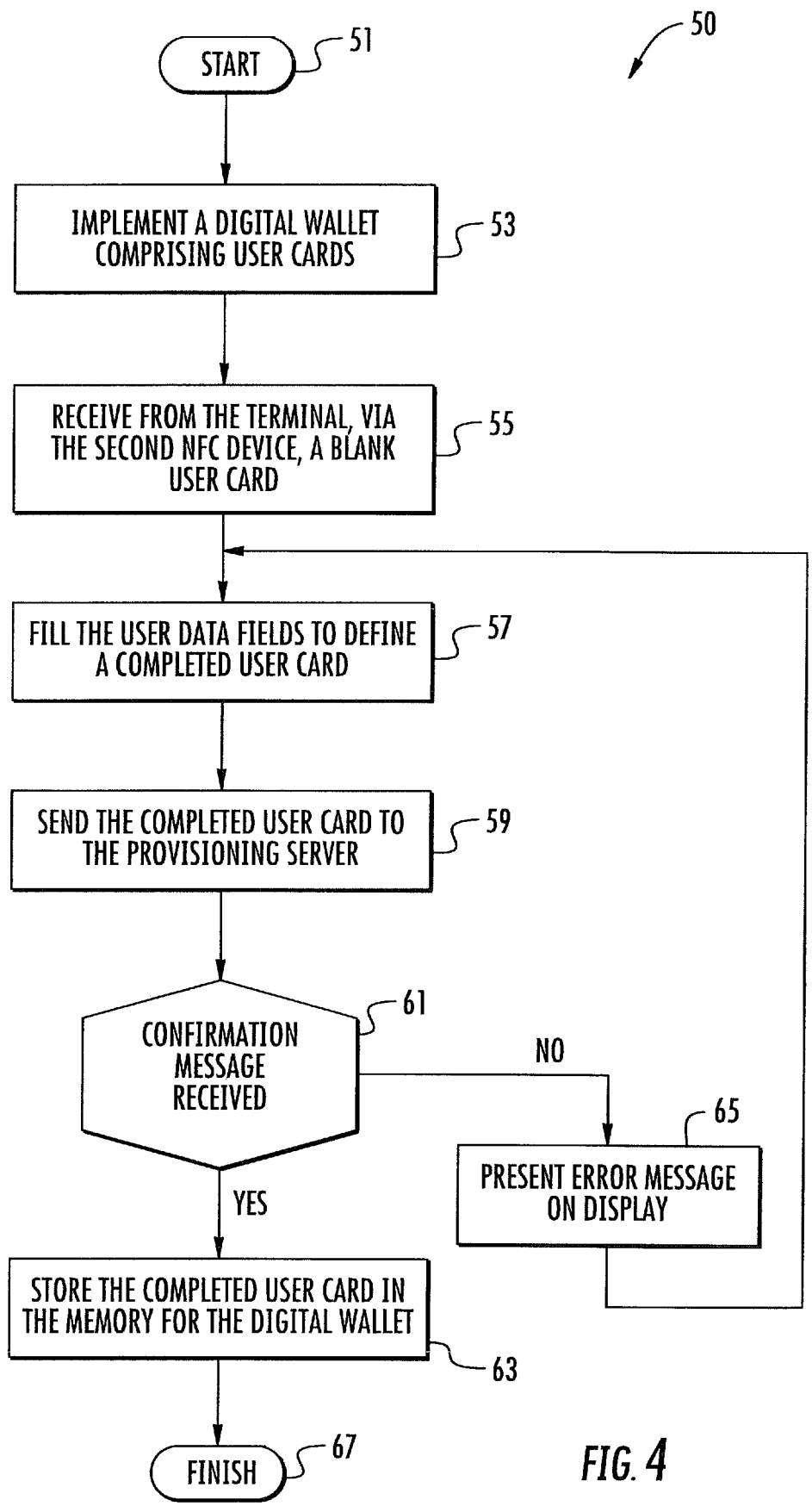
FIG. 4 is a flowchart illustrating operation of the mobile wireless communications device from the communication system of FIG. 1.

Referring now to FIGS. 1-3, a communication system 20 according to the present disclosure is now described. Moreover, with reference additionally to FIG. 4, a flowchart 50 illustrates a method of operating the communication system 20, the flowchart starting at Block 51.

The communication system 20 illustratively includes a terminal 22 comprising a first NFC device 30. In the illustrated embodiment, the terminal 22 comprises a POS terminal. The POS terminal may be collocated at a vendor location and include a payment receiving device (e.g. a cash register, or an inventory management terminal). The terminal 22 is capable of receiving data from a provisioning server 23. For example, the terminal 22 may be coupled to the provisioning server 23 via a networking arrangement, such as a local area network or the Internet. In some embodiments, the terminal 22 and the provisioning server 23 may be coupled as one device. Also, the terminal 22 may include other wireless transceivers, such as a Bluetooth™ transceiver or a WiFi™ transceiver.

The provisioning server 23 and the terminal 22 may be operated by the same vendor to provide an enhanced customer service. For example, the vendor may maintain a database comprising a plurality of customer user profiles.

The communication system 20 illustratively includes a mobile wireless communications device 21. The mobile wireless communications device 21 illustratively includes a housing 29, and a wireless transceiver 27 carried by the housing. The wireless transceiver 27 may comprise one or more of a cellular transceiver, an infrared transceiver, and a WLAN transceiver, such as BLUETOOTH™, ZIGBEE™, etc. The mobile wireless communications device 21 illustratively includes a second NFC device 25 carried by the housing 29, a memory 28 carried by the housing, a display 24 carried by the housing, and a processor 26 carried by the housing and coupled to the wireless transceiver 27, the second NFC device, the memory, and the display.

The processor 26 is configured to implement a digital wallet comprising a digital user card or a plurality of user cards (Block 53). The plurality of cards may comprise a customer loyalty card, a coupon card, an event ticket card, a credit card, a bank debit card, and/or other cards or various combinations of cards. Indeed, one or more of these digital cards may be maintained by the vendor using the provisioning server 23 and the terminal 22.

As will be appreciated, when the user accesses the digital wallet, the plurality of user cards may be presented on display 24 in list format or in some embodiments, presented as a corresponding plurality of card like icons, such as a tiled interface. For security, the digital wallet may be secured via a password, such as a numerical code, a finger gesture based lock, etc.

The processor 26 is configured to receive from the terminal 22, via the second NFC device 25, a blank user card including a plurality of user data fields (Block 55). The blank user card is provided from the provisioning server 23 and is associated with the database of the vendor. The plurality of user data fields may comprise a name field, a mailing address field, and an email address field. More or less user data fields may be provided. In short, the user data fields request the information needed to successfully subscribe/provision the user with a user card/account for the database of the vendor. More information may be requested.

The mobile wireless communications device 21 may receive the blank user card from multiple sources. In the illustrated embodiment, the mobile wireless communications device 21 receives the blank user card from the terminal 22 via an NFC link. In other words, the mobile wireless communications device 21 is bumped with the terminal 22. For example, in POS device embodiments, the user may bump the mobile wireless communications device 21 during a typical sale. In some embodiments, the terminal 22 may not communicate directly with the provisioning server 23, but only provide the blank user card to the mobile wireless communications device 21.

In other embodiments, the mobile wireless communications device 21 may receive the blank user card directly from the provisioning server 22 via a WLAN link using the Internet. Alternatively, the mobile wireless communications device 21 may receive the blank user card as an attachment within an email message. In yet another embodiment, the mobile wireless communications device 21 may receive a web link for the blank user card via the second NFC device 25, and separately download the blank user card from an Internet accessible server. Also, the user may receive the blank user card from another mobile device, such as via an NFC bump with another NFC enabled mobile device. In yet another embodiment, the user may download the blank user card from a database thereof in a mobile application platform.

Subsequent to the bump, the processor 26 is configured to fill the plurality of user data fields 41a-41d of the blank user card to define a completed user card (Block 57). For example, the user may manually (other embodiments may include automatic completion or partially automatic completion) complete the user data fields 41a-41d using an onboard user input interface, such as a physical keyboard, a virtual keyboard, or a voice input software module. Each user data field 41a-41d may comprise a user field name and associated maximum number of characters permitted.

In the illustrated embodiment, once the blank user card is received, as shown in screenshot 35 (FIG. 2), the processor 26 presents an initial splash screen. The initial splash screen illustratively includes an "apply now" button 36 for initiating the provisioning process with the provisioning server 23, and an option menu 37. The option menu 37 illustratively includes a back button for canceling the provisioning process, thereby deleting the blank user card, and a hypertext markup language (HTML) option button. The HTML option button may launch the system web browser to the vendor website for out of band provisioning with the vendor. In other words, the user provisions a new user card outside the digital wallet. Also, the initial splash screen illustratively includes vendor logo information for identifying the associated vendor for the blank user card. The initial splash screen can also include terms of service information for the vendor. Although not illustrated, the option menu 37 may also include a feature for saving the blank user card, perhaps partially filled out, in the memory 28 for later submission. Once the user selects the "apply now" button 36, the processor 26 initiates the provisioning process for the blank user card.

In some embodiments, the processor 26 may also be configured to store in the memory 28 default user data for the digital wallet. Advantageously, as shown in the screenshot 40 (FIG. 3), the processor 26 may automatically present the blank user card on the display 24 with the user data fields complete or partially complete. In these embodiments, the enrollment step is a one-step process since the processor 26 uses the stored default user data.

The screenshot 40 illustratively includes a submission button 42 for actuation by the user when the user data fields 41a-41d are completed to user satisfaction. In some embodiments, the processor 26 may automatically submit, if the user fails to cancel the process, the completed user card after a set period of time. Once the user data fields 41a-41d are complete and the user actuates the submission button 42, the processor 26 is configured to send the completed user card to the provisioning server 23 (Block 59). In some embodiments, the processor 26 may be configured to send the completed user card to the provisioning server 23 via the wireless transceiver 27 (e.g. over the Internet). The blank user card includes a return address for the provisioning server 23 associated therewith. For example, the return address may comprise an email address, or a uniform resource locater (URL). In some embodiments, the processor 26 executes the submission process based upon instructions in the blank user card.

In other embodiments, the processor 26 may be configured to send the completed user card to the provisioning server 23 via the second NFC device 25. In these embodiments, the user would need to bump the terminal 22 a second time, perhaps during a subsequent purchase. In these embodiments, the processor 26 may store the completed user card in the memory 28 for time duration determined by the user's frequency of using the vendor. In other embodiments, the communication system 20 may include a second terminal comprising a third NFC device adjacent an exit of the vendor place of business, requiring a user bump on the way out of the vendor place of business.

Regardless of method of transmission, once the provisioning server 23 has received the completed user card, several basic accuracy checks are performed thereon (e.g. checking for improper email or mailing address format, validation of registration). If the basic accuracy checks are cleared, the provisioning server 23 generates a confirmation message (Block 61). The processor 26 is configured to receive the confirmation message from the provisioning server 23. Once this confirmation message is received, the processor 26 can complete the provisioning process and store the completed user card in the memory 28 for the digital wallet, replacing the completed user card with a provisioned version thereof (Block 63). If the confirmation message is not received within a timeout period, the processor 26 will present an error message on the display 24 and return to the user data field completion step (Block 65), before ending at Block 67.

A method aspect is for operating a mobile wireless communications device 21 communicating with a terminal 22 comprising a first NFC device 30. The terminal 22 is capable of receiving data from a provisioning server 23. The method comprises using a processor 26 and memory 28 cooperating therewith in the mobile wireless communications device 21 to implement a digital wallet comprising a plurality of user cards, receive from the terminal 22, via a second NFC device 25 in the mobile wireless communications device, a blank user card including a plurality of user data fields 41*a*-41*d*, and filling the plurality of user data fields of the blank user card to define a completed user card and sending the completed user card to the provisioning server.

Figure 5:
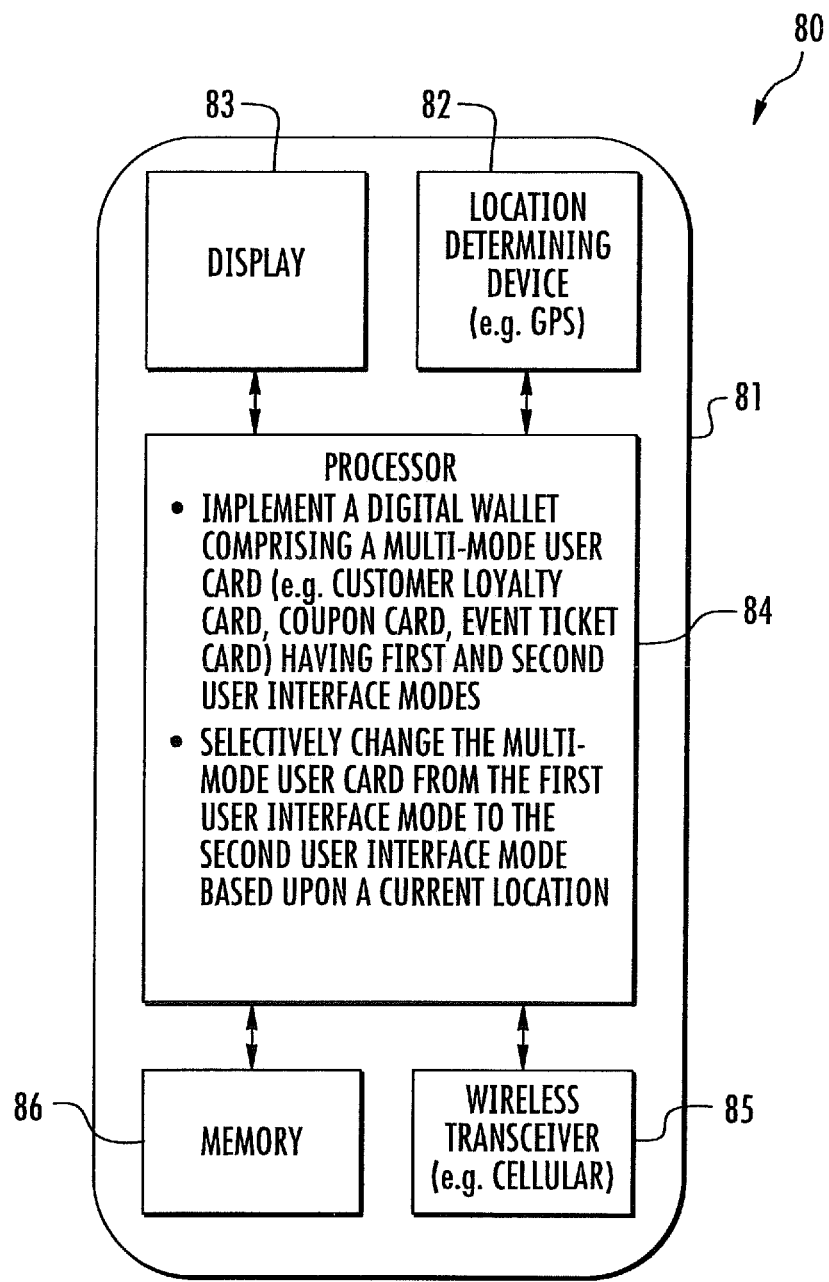
FIG. 5 is a schematic block diagram of an example embodiment of a mobile wireless communications device.
Figure 6:
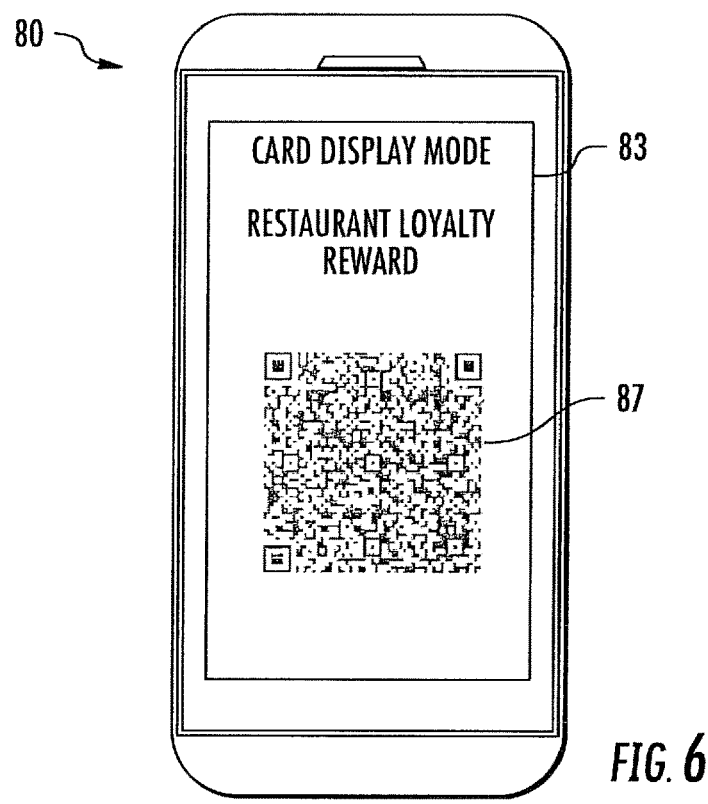
FIGS. 6-7 are screenshots from the mobile wireless communications device of FIG. 5.
Figure 7:
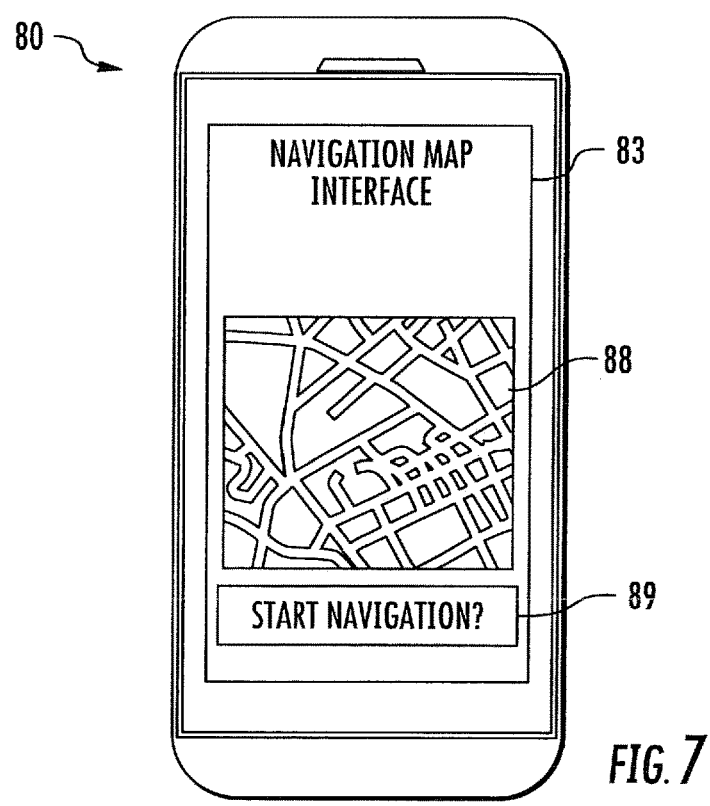
Figure 8:
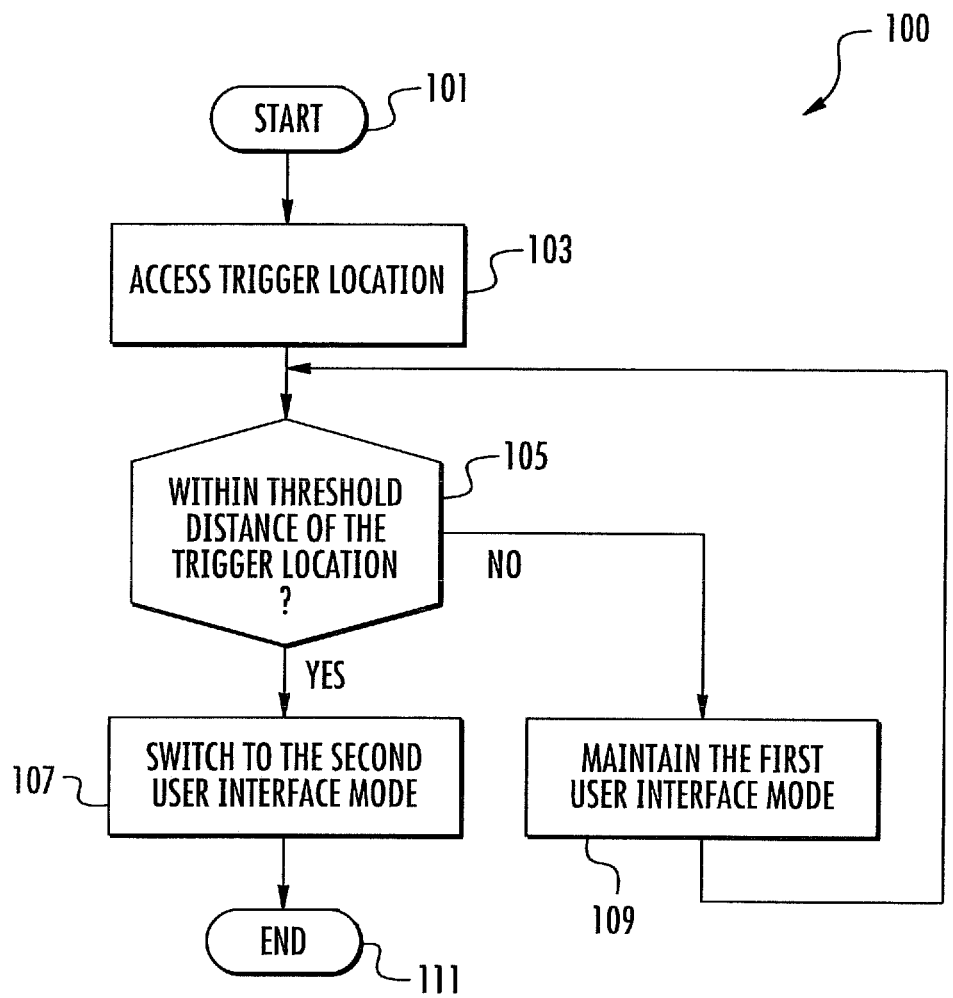
FIG. 8 is a flowchart illustrating operation of the mobile wireless communications device of FIG. 5.

Referring now to FIGS. 5-7, another mobile wireless communications device 80 according to the present disclosure is now described. Moreover, with reference additionally to FIG. 8, a flowchart 100 illustrates a method of operating the mobile wireless communications device 80, the flowchart starting at Block 101.

The mobile wireless communications device 80 illustratively includes a housing 81, and a wireless transceiver 85 carried by the housing. The wireless transceiver 85 may comprise one or more of a cellular transceiver, an infrared transceiver, and a WLAN transceiver, such as BLUETOOTH™, ZIGBEE™ (IEEE 802.15.4), etc.

The mobile wireless communications device 80 illustratively includes a display 83, a location determining device 82 carried by the housing 81 and configured to determine a current location, a memory 86 carried by the housing, and a processor 84 carried by the housing and coupled to the wireless transceiver 85, the location determining device, the memory, and the display. For example, the location determining device 82 may comprise a global positioning system (GPS) receiver determining the current location to comprise a geolocation value. In other embodiments, the location determining device 82 may comprise a WLAN transceiver communicating with the Internet to determine location.

The processor 84 is configured to implement a digital wallet comprising one or more multi-mode user cards, each multi-mode user card having first (FIG. 6) and second (FIG. 7) user interface modes. The processor 84 is configured to selectively change at least one multi-mode user card from the first user interface mode to the second user interface mode based upon the current location (e.g. geolocation). For example, the at least one multi-mode user card may comprise a customer loyalty card, a coupon card, or an event ticket card.

In particular, the processor 84 is configured to store in the memory 86 a trigger location associated with the at least one multi-mode user card, and access the trigger location (Block 103). The processor 84 is configured to selectively change the at least one multi-mode user card from the first user interface mode to the second user interface mode based upon the current location being within a threshold distance (e.g. 0.50 km, 100 meters, etc.) of the trigger location. The threshold distance may be speed based, i.e. if the mobile wireless communications device 80 is traveling at a high speed, the threshold distance may increase and vice versa. In some embodiments, the trigger location would be embedded in the at least one multi-mode user card. In other words, when the user installs the at least one multi-mode user card into the digital wallet, the associated vendor includes the trigger location therein.

In some embodiments, the trigger location may comprise a plurality thereof. For example, the plurality of trigger locations may comprise a plurality of vendor locations for the associated vendor of the at least one multi-mode user card. As shown in FIG. 6, the first user interface mode comprises a card display mode, i.e. a primary operation mode. When the mobile wireless communications device 80 is within a certain radius of one or more of the trigger locations, the at least one multi-mode user card switches to the second user interface mode (Blocks 105, 107), before ending at Block 111. Otherwise, the at least one multi-mode user card remains in the first user interface mode (Block 109).

In the illustrated embodiment of FIGS. 6-7, the first user interface mode comprises a restaurant loyalty card reward having a quick response (QR) code 87. When the at least one multi-mode user card switches to the second user interface mode, the second user interface mode includes a mapping interface mode 88. For example, in the illustrated embodiment, the mapping interface mode 88 may include a navigational direction mode with a navigate start button 89. Advantageously, when the user is nearby a vendor location, the at least one multi-mode user card may present the user with a map of the location and a one-click opportunity to launch a navigation application directed to that vendor location.

Another aspect is directed to a method of operating a mobile wireless communications device 80. The method includes using a processor 84 coupled to a wireless transceiver 85, a location determining device 82, and a memory 86 to implement a digital wallet comprising at least one multi-mode user card having first and second user interface modes, and selectively change the at least one multi-mode user card from the first user interface mode to the second user interface mode based upon a current location, the second user interface mode comprising a mapping interface mode 88.

Figure 9:
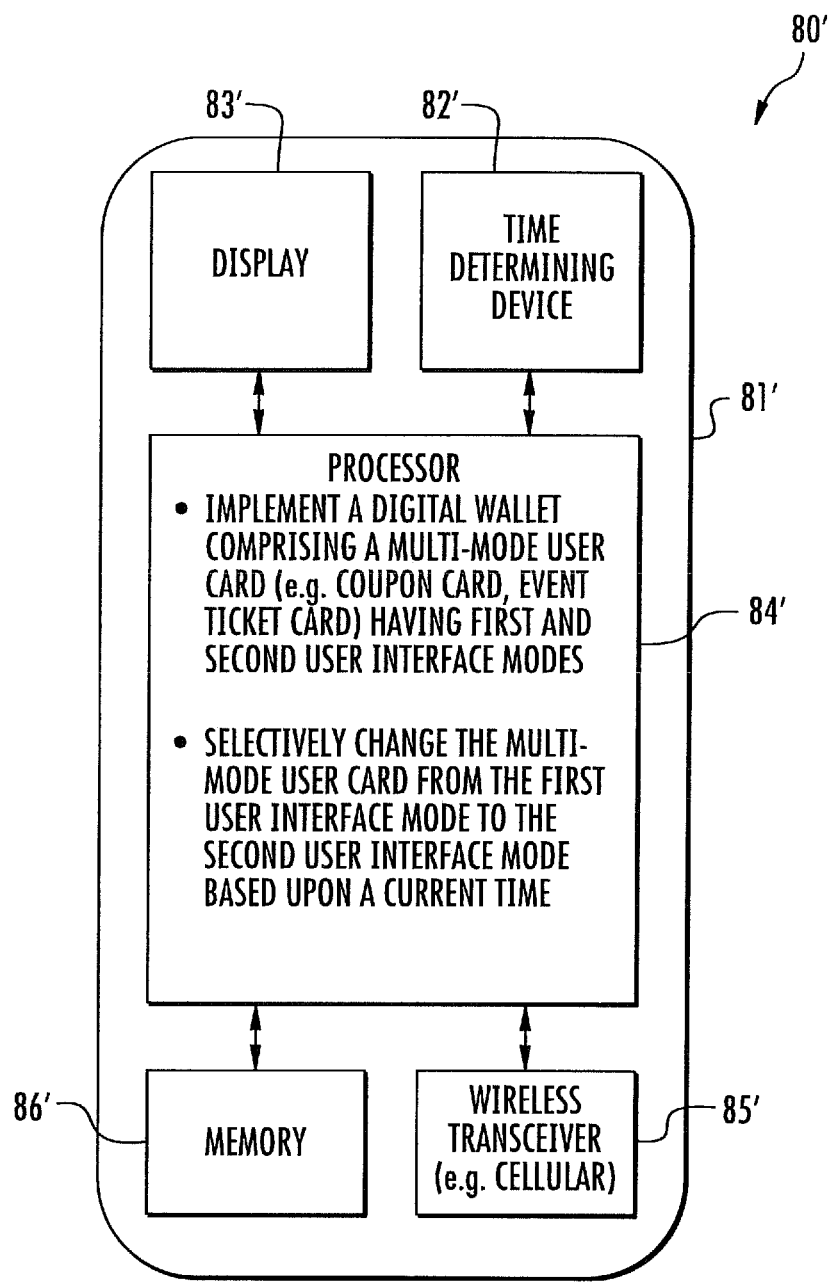
FIG. 9 is a schematic block diagram of another example embodiment of a mobile wireless communications device.
Figure 10:
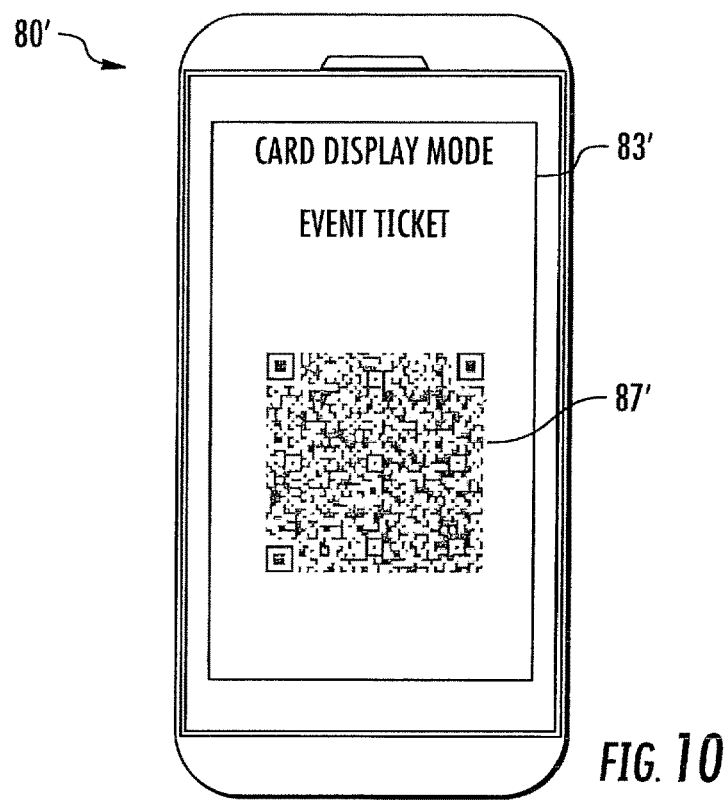
FIGS. 10-11 are screenshots of from the mobile wireless communications device of FIG. 9.
Figure 11:
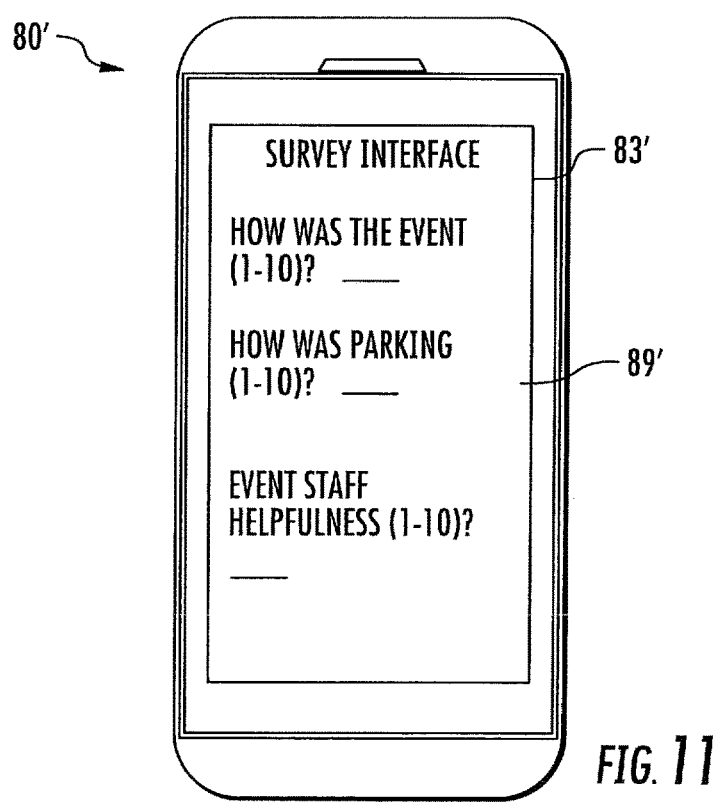
Figure 12:
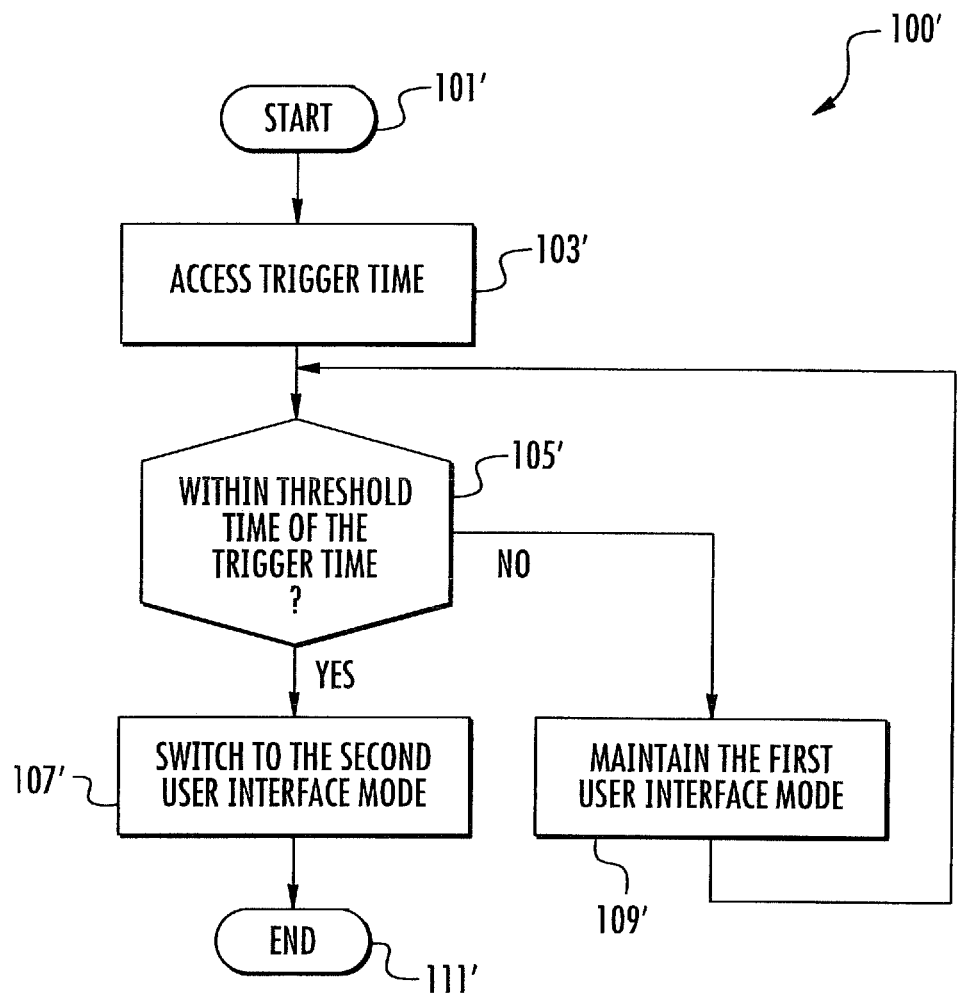
FIG. 12 is a flowchart illustrating operation of the mobile wireless communications device of FIG. 9.

Referring now to FIGS. 9-11, another embodiment of the mobile wireless communications device 80' according to the present disclosure is now described. Moreover, with reference additionally to FIG. 12, a flowchart 100' illustrates another embodiment of a method of operating the mobile wireless communications device 80', the flowchart starting at Block 101'. In this embodiment of the mobile wireless communications device 80' and method for operating therefor, those steps and elements already discussed above with respect to FIGS. 5-8 are given prime notation and most require no further discussion herein.

This mobile wireless communications device 80' additionally includes a time determining device 82' carried by the housing 81' and configured to determine a current time. The time determining device 82' may comprise an internal clock (hardware or software) or a module for accessing Internet timeservers. The mobile wireless communications device 80' illustratively includes a memory 86' carried by the housing 81', and a processor 84' carried by the housing and coupled to the wireless transceiver 85', the time determining device 82', and the memory.

In this embodiment, the processor 84' is illustratively configured to implement a digital wallet comprising at least one multi-mode user card having first (FIG. 10) and second (FIG. 11) user interface modes, and selectively change the at least one multi-mode user card from the first user interface mode to the second user interface mode based upon the current time. For example, the at least one multi-mode user card may comprise a coupon card, or an event ticket card.

The processor 84' accesses a trigger time from the memory 86'. As in the above embodiments, the trigger time may be embedded in the at least one multi-mode user card.

The first user interface mode may comprise a card display mode. In FIG. 10, the card display mode illustratively comprises an event ticket card having a QR code 87'. The second user interface mode illustratively comprises a survey interface mode 89'. In another embodiment, the second user interface mode may also comprise an option to purchase more tickets from the event provider, i.e. a purchase interface mode. In some embodiments, the purchase interface mode would be presented after the user completes a favorable survey in the survey interface mode.

The processor 84' is configured to store in the memory 86' the trigger time associated with the at least one multi-mode user card, and to access the trigger time periodically (Block 103'). The processor 84' is configured to selectively change the at least one multi-mode user card from the first user interface mode to the second user interface mode based upon the current time being within a threshold time (either before or after) of the trigger time (Blocks 105', 107'), before ending at Block 111'. For example, in the illustrative event ticket embodiment, the trigger time may comprise a time of expected event completion, and the threshold time may comprise 0-15 minutes. Advantageously, when the event for the event ticket card ends, the user is automatically presented with a survey interface mode 89' for rating the event. The event may comprise, for example, a concert event ticket. The at least one multi-mode user card may include a return address for sending the completed survey to the source automatically and without user intervention. If the current time is not within the threshold time (Block 105'), the first user interface mode is maintained (Block 109').

Another aspect is directed to a method of operating a mobile wireless communications device 80'. The method includes using a processor 84' coupled to a wireless transceiver 85', a time determining device 82', and a memory 86' to implement a digital wallet comprising at least one multi-mode user card having first and second user interface modes, and selectively change the at least one multi-mode user card from the first user interface mode to the second user interface mode based upon a current time. The second user interface mode comprises a survey interface mode 89'.

Figure 13:
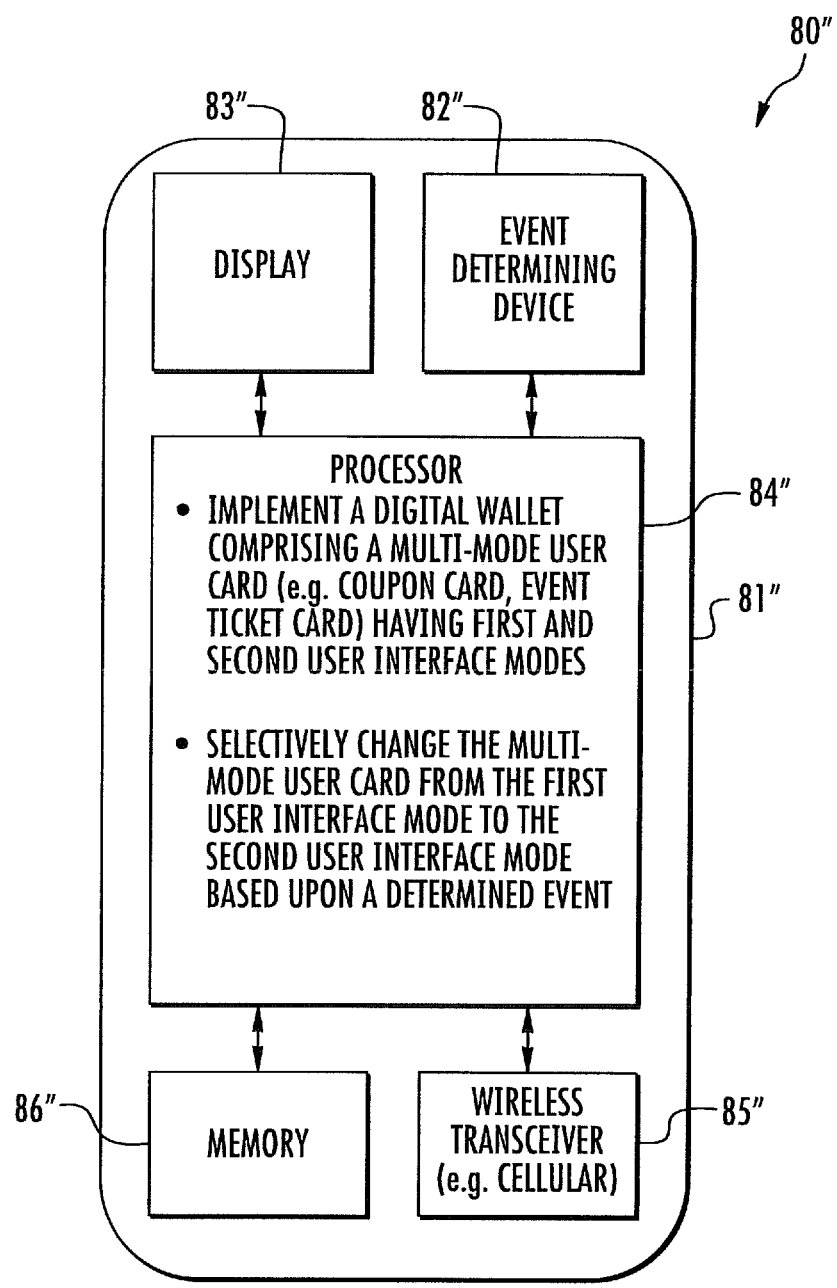
FIG. 13 is a schematic block diagram of yet another example embodiment of a mobile wireless communications device.
Figure 14:
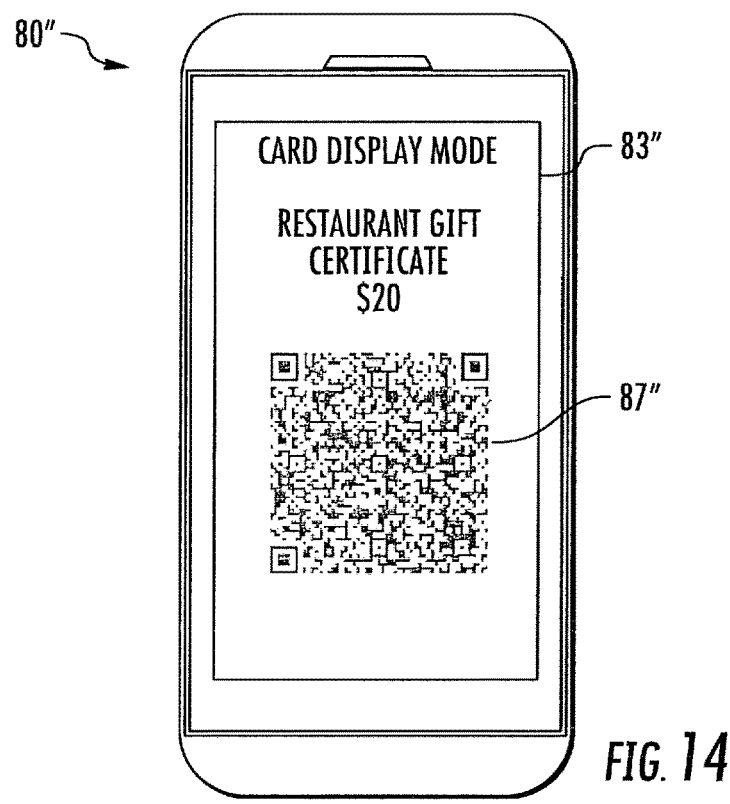
FIGS. 14-15 are screenshots of from the mobile wireless communications device of FIG. 13.
Figure 15:
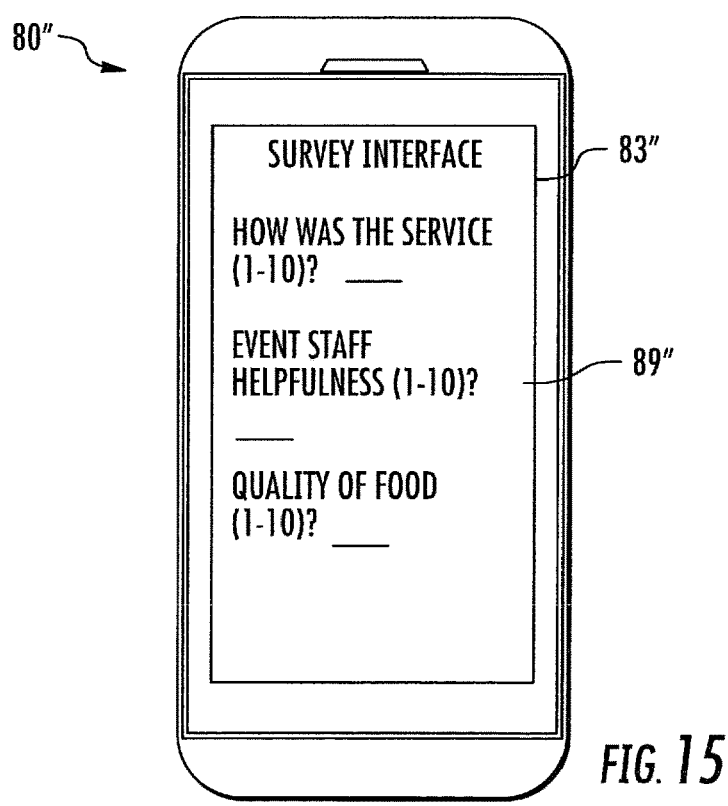
Figure 16:
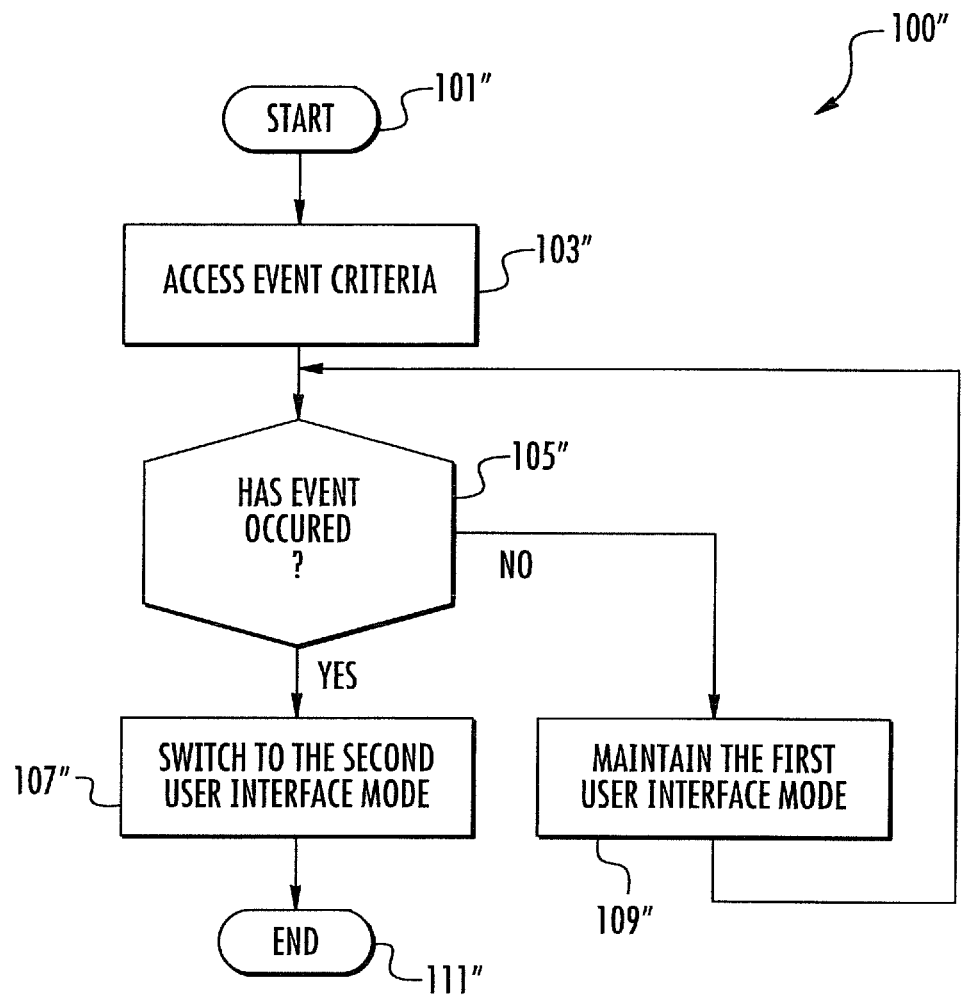
FIG. 16 is a flowchart illustrating operation of the mobile wireless communications device of FIG. 13.

Referring now to FIGS. 13-15, another embodiment of the mobile wireless communications device 80" according to the present disclosure is now described. Moreover, with reference additionally to FIG. 16, a flowchart 100" illustrates another embodiment of a method of operating the mobile wireless communications device 80", the flowchart starting at Block 101". In this embodiment of the mobile wireless communications device 80" and method for operating therefor, those steps and elements already discussed above with respect to FIGS. 5-8 are given double prime notation and most require no further discussion herein.

This mobile wireless communications device 80" additionally includes an event determining device 82" carried by the housing 81" and configured to determine an event. The processor 84" is configured to implement a digital wallet comprising at least one multi-mode user card having first (FIG. 14) and second (FIG. 15) user interface modes, and selectively change the at least one multi-mode user card from the first user interface mode to the second user interface mode based upon the determined event. For example, the at least one multi-mode user card may comprise a coupon card, or an event ticket card.

The first user interface mode may comprise a card display mode. In the illustrated embodiment, the first user interface mode comprises a restaurant gift certificate comprising a QR code 87". The second user interface mode illustratively includes a survey interface mode 89".

The method illustratively includes accessing the event criteria stored in the memory 86" (Block 103"). In some embodiments, the event determining device 82" is configured to monitor whether the at least one multi-mode user card has been used or redeemed (Block 105"). For example, the processor 84" is configured to monitor whether the QR code 87" of the event ticket card has been scanned for admittance.

If the at least one multi-mode user card has been used or redeemed, the processor 84" changes the at least one multi-mode user card from the first user interface mode to the second user interface mode (Block 107"). Otherwise, the processor 84" is configured to maintain the at least one multi-mode user card in the first user interface mode (Block 109"), the method ends at Block 111".

Another aspect is directed to a method of operating a mobile wireless communications device 80". The method includes using a processor 84" coupled to a wireless transceiver 85", an event determining device 82", and a memory 86" to implement a digital wallet comprising at least one multi-mode user card having first and second user interface modes, and selectively change the at least one multi-mode user card from the first user interface mode to the second user interface mode based upon a determined event, the second user interface mode comprising a survey interface mode.

Example components of a mobile wireless communications device 1000 that may be used in accordance with the above-described embodiments are further described below with reference to FIG. 17. The device 1000 illustratively includes a housing 1200, a keyboard or keypad 1400 and an output device 1600. The output device shown is a display 1600, which may comprise a full graphic liquid crystal display (LCD). Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 17:
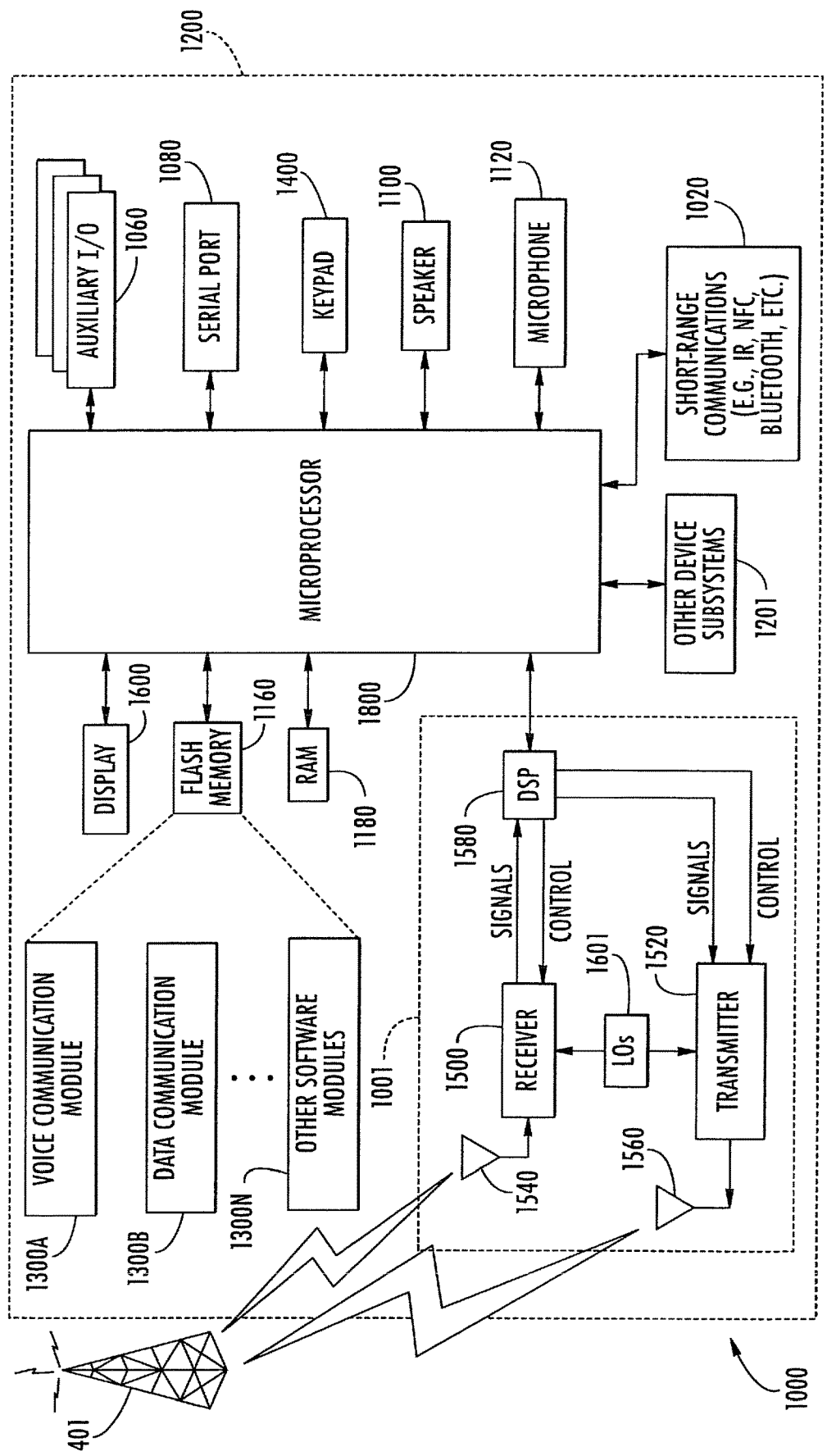
FIG. 17 is a schematic block diagram illustrating example components of a mobile wireless communications device that may be used with the communication system of FIG. 1.

In addition to the processing device 1800, other parts of the mobile device 1000 are shown schematically in FIG. 17. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem 1020. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™, or General Packet Radio Service (GPRS) mobile data communications networks, and also designed to operate with any of a variety of voice communications networks, such as Advanced Mobile Phone System (AMPS), time division multiple access (TDMA), code division multiple access (CDMA), Wideband code division multiple access (W-CDMA), personal communications service (PCS), GSM (Global System for Mobile Communications), enhanced data rates for GSM evolution (EDGE), etc. Other types of data and voice networks, both separate and integrated, may also be utilized with the mobile device 1000. The mobile device 1000 may also be compliant with other communications standards such as 3GSM, 3rd Generation Partnership Project (3GPP), Universal Mobile Telecommunications System (UMTS), 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a NFC sensor for communicating with a NFC device or NFC tag via NFC communications.

Many modifications and other embodiments will come to the mind of one skilled in the art having the benefit of the teachings presented in the foregoing descriptions and the associated drawings. For example, in an alternative embodiment, instead of using NFC for the digital card information transfer, other wired or wireless communication networks or channels (such as other short range wireless networks) may be used. Therefore, it is understood that various modifications and embodiments are intended to be included within the scope of the appended claims.

The invention claimed is:

1. A wireless communications device comprising:
   a location determining device configured to detect a current location of the wireless communications device;
   a memory configured to store a trigger location associated with a multi-mode user card, the multi-mode user card having a first user interface mode and a second user interface mode;
   a display configured to display the multi-mode user card; and
   a processor in operative communication with the location determining device, the memory, and the display, the memory storing program instructions that when executed by the processor cause the wireless communications device to:
   display the multi-mode user card on the display;
   while the multi-mode user card is displayed by the display, launch a web browser to perform out of band provisioning of a version of the multi-mode user card with a provisioning server;
   send version of the multi-mode user card to the provisioning server;
   receive a confirmation message from the provisioning server indicating accuracy of the version of the multi-mode user card;
   in response to receiving the confirmation message, store the version of the multi-mode user card in the memory;
   render the version of the multi-mode user card on the display in the first user interface mode; and
   automatically change the display of the multi-mode user card from the first user interface mode to the second user interface mode when the current location detected by the location determining device corresponds to the trigger location stored in the memory, wherein the second user interface mode is a mapping interface mode for providing directions to a user of the wireless communications device.

2. The wireless communications device of claim 1, wherein the detected current location corresponds to the trigger location when the detected current location is within a threshold distance of the trigger location.

3. The wireless communications device of claim 2, wherein the mapping interface mode provides directions to the user to the trigger location.

4. The wireless communications device of claim 1, wherein the multi-mode user card is obtained by the wireless communications device from the provisioning server or a terminal at a vendor location corresponding to the trigger location.

5. The wireless communications device of claim 1, wherein the multi-mode user card comprises a plurality of trigger locations, and the detected current location corresponds to the trigger location when the detected current location is within a threshold distance of one of the plurality of trigger locations, and the mapping interface mode provides directions to the user to the one of the plurality of trigger locations.

6. The wireless communications device of claim 1, wherein the program instructions, when executed by the processor, further cause the wireless communications device to transmit user data for user data fields comprised in the multi-mode user card to the provisioning server prior to storing the multi-mode user card.

7. The wireless communications device of claim 6, wherein the program instructions, when executed by the processor, further cause the wireless communications device to receive a confirmation message from the provisioning server in response to transmitting the user data, prior to storing the multi-mode user card.

8. The wireless communications device of claim 7, wherein the multi-mode user card that is stored comprises the user data.

9. A method comprising:
   displaying a multi-mode user card on a display of a wireless communications device, the multi-mode user card having a first user interface mode and a second user interface mode;
   while the multi-mode user card is displayed by the display, launching a web browser to perform out of band provisioning of a version of the multi-mode user card with a provisioning server;
   sending the version of the multi-mode user card to the provisioning server;
   receiving a confirmation message from the provisioning server indicating accuracy of the version of the multi-mode user card;
   in response to receiving the confirmation message, store the version of the multi-mode user card in a memory of the wireless communications device;
   rendering the version of the multi-mode user card on the display in the first user interface mode;
   detecting a current location of the wireless communications device; and
   automatically changing the display of the multi-mode user card from the first user interface mode to the second user interface mode when the current location corresponds to a trigger location associated with the multi-mode user card and stored in the memory, wherein the second user interface mode is a mapping interface mode for providing directions to a user of the wireless communications device.

10. The method of claim 9, wherein the detected current location corresponds to the trigger location when the detected current location is within a threshold distance of the trigger location.

11. The method of claim 10, wherein the mapping interface mode provides directions to the user to the trigger location.

12. The method of claim 9, wherein the multi-mode user card is obtained by the wireless communications device from the provisioning server or a terminal at a vendor location corresponding to the trigger location.

13. The method of claim 9, wherein the multi-mode user card comprises a plurality of trigger locations, and the detected current location corresponds to the trigger location when the detected current location is within a threshold distance of one of the plurality of trigger locations, and the mapping interface mode provides directions to the user to the one of the plurality of trigger locations.

14. The method of claim 9, further comprising transmitting user data for user data fields comprised in the multi-mode user card to the provisioning server prior to storing the multi-mode user card.

15. The method of claim 14, further comprising receiving a confirmation message from the provisioning server in response to transmitting the user data, prior to storing the multi-mode user card, wherein the multi-mode user card that is stored comprises the user data.

16. A non-transitory computer readable medium storing code which, when executed by a processor of a wireless communications device causes the wireless communications device to:
- display a multi-mode user card on a display of the wireless communications device, the multi-mode user card having a first user interface mode and a second user interface mode;
- while the multi-mode user card is displayed by the display, launch a web browser to perform out of band provisioning of a version of the multi-mode user card with a provisioning server;
- send version of the multi-mode user card to the provisioning server;
- receive a confirmation message from the provisioning server indicating accuracy of the version of the multi-mode user card;
- in response to receiving the confirmation message, store the version of the multi-mode user card in a memory of the wireless communications device;
- render the version of the multi-mode user card on the display in the first user interface mode;
- detect a current location of the wireless communications device; and
- automatically change the display of the multi-mode user card from the first user interface mode to the second user interface mode when the current location corresponds to a trigger location associated with the multi-mode user card and stored in the memory, wherein the second user interface mode is a mapping interface mode for providing directions to a user of the wireless communications device.

17. The non-transitory computer readable medium of claim 16, wherein the detected current location corresponds to the trigger location when the detected current location is within a threshold distance of the trigger location.

18. The non-transitory computer readable medium of claim 17, wherein the mapping interface mode provides directions to the user to the trigger location.

19. The non-transitory computer readable medium of claim 16, wherein the multi-mode user card is obtained by the wireless communications device from the provisioning server or a terminal at a vendor location corresponding to the trigger location.

20. The non-transitory computer readable medium of claim 16, wherein the multi-mode user card comprises a plurality of trigger locations, and the detected current location corresponds to the trigger location when the detected current location is within a threshold distance of one of the plurality of trigger locations, and the mapping interface mode provides directions to the user to the one of the plurality of trigger locations.

* * * * *